United States Patent
Ramesh et al.

(10) Patent No.: US 8,811,352 B2
(45) Date of Patent: Aug. 19, 2014

(54) METHOD AND APPARATUS FOR CHANNEL ESTIMATION IN A TRANSMIT DIVERSITY ENVIRONMENT

(75) Inventors: Rajaram Ramesh, Raleigh, NC (US);
Havish Koorapaty, Cary, NC (US);
Kumar Balachandran, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1864 days.

(21) Appl. No.: 11/757,777

(22) Filed: Jun. 4, 2007

(65) Prior Publication Data

US 2008/0298264 A1    Dec. 4, 2008

(51) Int. Cl.
*H04W 4/00* (2009.01)

(52) U.S. Cl.
USPC ............................ 370/334; 370/500; 455/101

(58) Field of Classification Search
USPC ............................ 370/252, 334, 500; 455/101
See application file for complete search history.

(56) References Cited

U.S. PATENT DOCUMENTS

| | | | | |
|---|---|---|---|---|
| 2004/0047284 | A1 | 3/2004 | Eidson | |
| 2005/0052989 | A1* | 3/2005 | Tao et al. ...................... | 370/203 |
| 2005/0195763 | A1* | 9/2005 | Kadous et al. ................ | 370/328 |
| 2006/0013186 | A1* | 1/2006 | Agrawal et al. ............... | 370/344 |
| 2006/0120395 | A1* | 6/2006 | Xing et al. .................... | 370/431 |
| 2007/0263734 | A1* | 11/2007 | Seki .............................. | 375/259 |

FOREIGN PATENT DOCUMENTS

| WO | WO2006082637 | * | 8/2006 | ............... H04B 7/26 |
|---|---|---|---|---|
| WO | 2007/015694 A2 | | 2/2007 | |

OTHER PUBLICATIONS

IEEE Standards 802.16—Oct. 1, 2004. Part 16: Air Interface for Fixed Broadband Wireless Access Systems.
IEEE Standards 802.16e—Feb. 28, 2006. Part 16: Air Interface for Fixed Broadband Wireless Access Systems, Amendment 2: Physical and Medium Access Control Layers for Combined Fixed and Mobile Operation in Licensed Bands and Corrigendum 1.
Guey, J.-C. et al. "Low Complexity Channel Estimation for Minimizing Edge Effects in OFDM Systems." IEEE 65th Vehicular Technology Conference, 2007 (VTC2007-Spring), Apr. 22-25, 2007, pp. 1440-1444.
Auer, Gunther. "Channel Estimation by Set Partitioning for OFDM with Cyclic Delay Diversity." 2004 IEEE 60th Vehicular Technology Conference, 2004, VTC2004-Fall. vol. 1, Sep. 26-29, 2004, pp. 669-673.
Bauch, Gerhard. "Capacity Optimization of Cyclic Delay Diversity." 2004 IEEE 60th Vehicular Technology Conference, 2004, VTC2004-Fall. vol. 3, Sep. 26-29, 2004, pp. 1820-1824.

(Continued)

*Primary Examiner* — Omer S Mian
(74) *Attorney, Agent, or Firm* — Coats and Bennett, P.L.L.C.

(57) ABSTRACT

A method of channel estimation for a signal having a first portion transmitted using a transmit delay diversity scheme and a second portion transmitted using another multi-antenna transmission scheme includes determining a composite channel estimate from the transmit delay diversity portion of the signal. The method continues with segregating the composite channel estimate into delay groups corresponding to time offsets of the transmit delay diversity scheme for determination of first channel estimates for each subset of transmit antennas. Second channel estimates are determined for each subset of transmit antennas as a function of pilot symbols received in the second portion of the signal and corresponding ones of the first channel estimates. Thus, the first channel estimates are used to improve estimation of the second channel estimates. The method and variations of it may be implemented by configuring one or more processing circuits within a receiver circuit.

31 Claims, 3 Drawing Sheets

(56) References Cited

OTHER PUBLICATIONS

Bauch, Gerhard et al. "Orthogonal Frequency Division Multiple Access with Cyclic Delay Diversity." ITG Workshop on Smart Antennas, 2004. pp. 17-24.

"Mobile WiMAX—Part I: A Technical Overview and Performance Evaluation." Aug. 2006. Available at: www.wimaxforum.org/technology/downloads/Mobile_WiMAX_Part1_Overview_and_Performance.pdf.

* cited by examiner

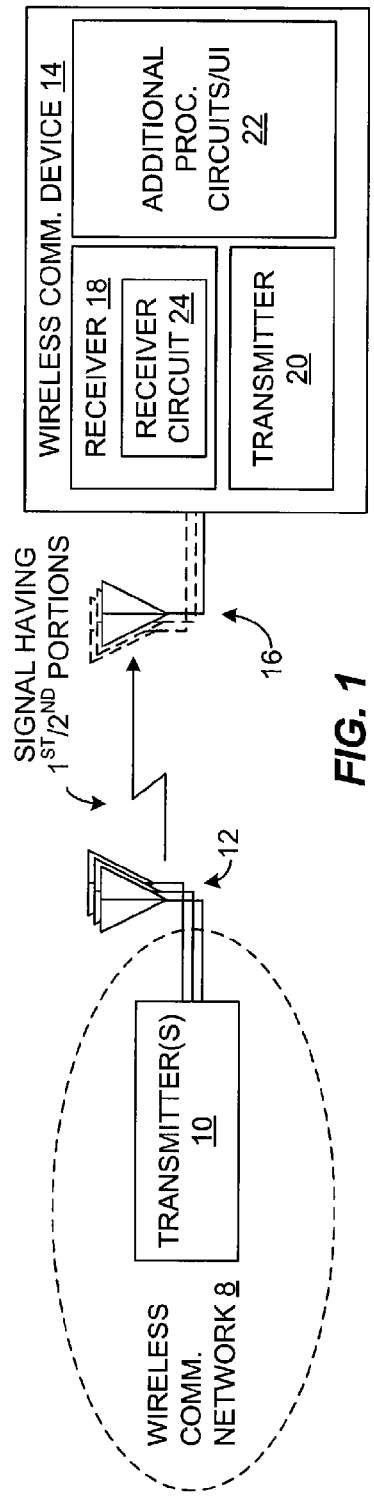
FIG. 1
*PRIOR ART*
FIG. 2

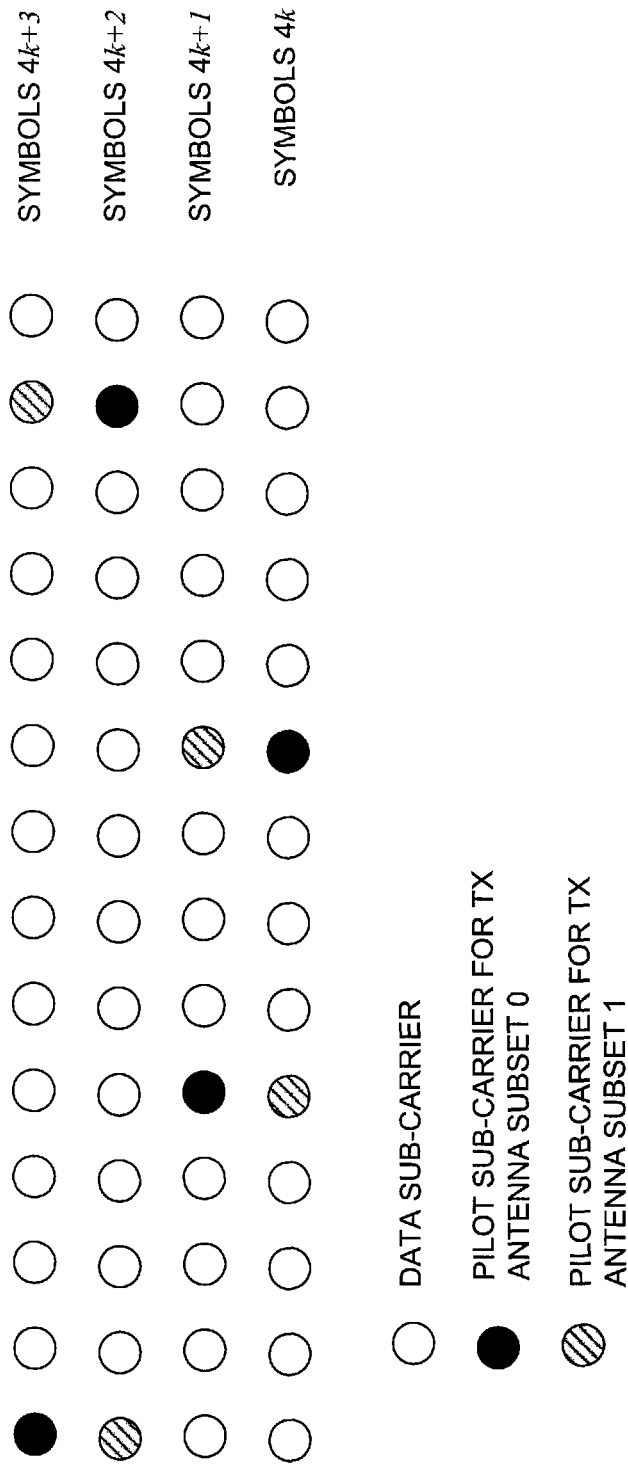
PRIOR ART
FIG. 3

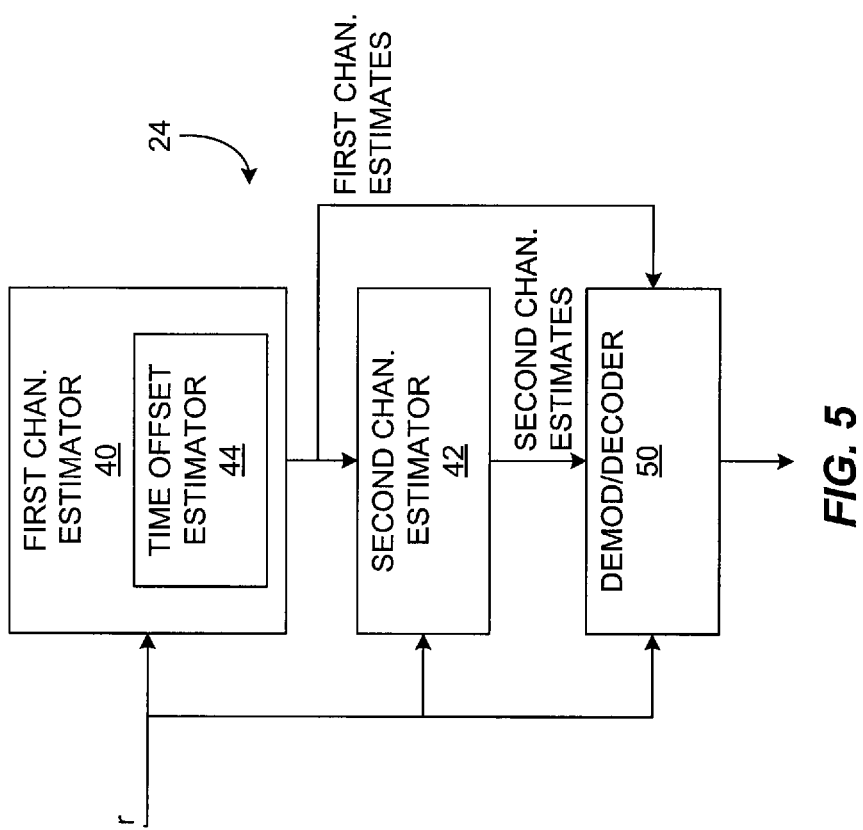
FIG. 5
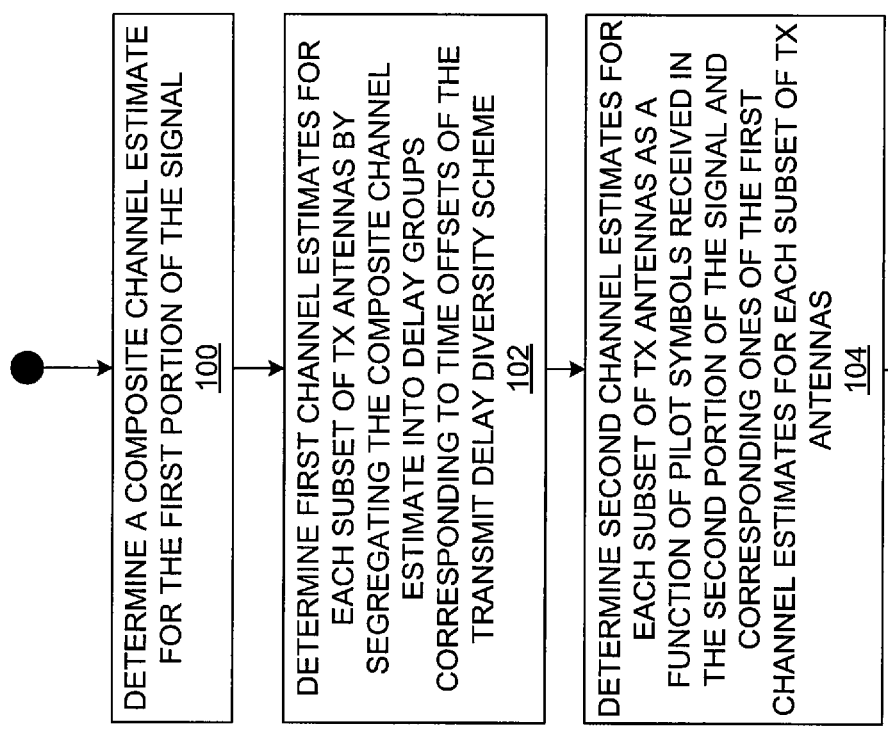
FIG. 4

METHOD AND APPARATUS FOR CHANNEL ESTIMATION IN A TRANSMIT DIVERSITY ENVIRONMENT

BACKGROUND

The present invention generally relates to channel estimation, and particularly relates to channel estimation in a transmit diversity environment.

Transmit diversity techniques, broadly referred to as multi-antenna transmission schemes, are of increasing interest in wireless communication systems, primarily for their promise of higher data transmission rates and/or the ability to serve a greater number of users. Such schemes include various Multiple-Input-Single-Output (MISO) and Multiple-Input-Multiple-Output (MIMO) approaches, and may involve various forms of Space-Time-Coding (STC) techniques.

Not surprisingly, however, the use of transmit diversity brings with it attendant increases in system complexity. For example, the use of transmit diversity schemes typically exacerbates the problem of channel estimation in wireless communication systems, because channel estimates typically must be made for multiple transmit antennas rather than just one. In general, full realization of transmit diversity benefits requires the estimation of channel paths between each transmit/receive antenna pair.

One difficulty with accurately generating reliable channel estimates for particular transmit antennas or, more generally, for subsets of one or more transmit antennas, involves the amount of antenna-specific pilot information available to the receiver. Suitably reliable channel estimates for each transmit antenna could be obtained in a relatively straightforward manner if each transmitting antenna or, more generally, each subset of one or more associated transmit antennas, provided a rich amount of pilot information. However, the transmission of pilot information comes at the expense of data transmission—i.e., transmission resources used for pilot information generally represent resources not available for data transmission. Thus, there is a tension between the desire to support good channel estimation at targeted receivers, which is after all required for acceptable receiver performance, and the desire to maximize the amount of transmission resources allocated for the transmission of data (user traffic and control signaling).

The implementation of transmit diversity tends to complicate matters because the targeted receivers generally need enough antenna-specific pilot information to make good channel estimates for each subset of transmit antennas. That need is at odds with current and developing approaches, which tend to divide or otherwise split the total amount of pilot information being transmitted across the different transmit antennas being used for transmit diversity.

For example, Orthogonal Frequency Division Multiplexing (OFDM) signals, such as WiMax signals defined by the IEEE 802.16 standards, define a total number of narrow band subcarriers, each subcarrier having a different frequency. Different subsets of subcarriers are used at different times to transmit information to users, with some relatively small number of subcarriers designated as pilot subcarriers, with the remaining subcarriers designated as data subcarriers. With one transmit antenna, the number of pilot subcarriers generally is sufficient for good channel estimation at the targeted receivers. However, when the total number of pilot subcarrier designations is split or otherwise shared across multiple transmit antennas, the amount of antenna-specific pilot information is correspondingly reduced.

That condition generally is not a problem at least for the downlink "preamble" portion of WiMax signal frames, but it is problematic for the data or payload portion of those frames. More specifically, the preamble portion of a WiMax frame often is used as a "broadcast" type transmission, allowing reception at targeted receivers. As such, it may be undesirable to adopt a multi-antenna transmission scheme for the preamble that may be incompatible with certain receivers. One approach is the use of transmit delay diversity for preamble transmission, wherein the same signal is transmitted from different transmit antennas at different times, with the overall "channel" being a composite of the involved transmission paths.

In contrast, the different bursts within the data portions of WiMax frames generally are targeted to individual receivers and thus can be tailored to the diversity processing capability of those receivers. Therefore, the payload or data portion of the downlink transmission may use another form of multi-antenna transmission, i.e., something other than transmit delay diversity, to obtain higher data throughput and/or to serve more users. However, doing so decreases the number of antenna-specific pilot symbols available to the targeted receivers, and thereby complicates the task of making reliable channel estimates for the data portion of the WiMax signal.

SUMMARY

The adoption of multi-antenna transmission schemes can reduce the amount of antenna-specific pilot information available for reliable channel estimation. However, where such transmission schemes are juxtaposed with transmit delay diversity transmissions, particularly where the delay diversity transmissions are relatively rich in pilot information, an appropriately configured receiver can determine channel estimates for each subset of transmit antennas from the transmit delay diversity transmissions, and then use those estimates to improve channel estimation for the subsequent multi-antenna transmission. As used herein, a "subset" of transmit antennas may comprise a single antenna, or a related set of two or more antennas. Thus, the teachings herein may be applied per antenna or per antenna group, depending upon the particular transmission circumstances.

Thus, in one embodiment, a method of channel estimation for a signal having a first portion transmitted using a transmit delay diversity scheme and a second portion transmitted using another multi-antenna transmission scheme includes determining a composite channel estimate for the first portion of the signal, and determining first channel estimates for each subset of transmit antennas based on segregating the composite channel estimate into delay groups corresponding to time offsets of the transmit delay diversity scheme. The method further includes determining second channel estimates for each subset of transmit antennas as a function of pilot symbols received in the second portion of the signal and corresponding ones of the first channel estimates for each subset of transmit antennas. With this approach, the corresponding ones of the first channel estimates for the subsets of transmit antennas are used to improve estimation of the second channel estimates for the subsets of transmit antennas for the second portion of the signal.

In at least one embodiment, a method of channel estimation for a signal having a first portion transmitted using a transmit delay diversity scheme and a second portion transmitted using another multi-antenna transmission scheme includes determining a composite channel estimate for the first portion of the signal, and determining first channel estimates for each subset of transmit antennas from the composite channel estimate. The method further includes using the first channel estimates for each subset of transmit antennas in a channel estimation process used for determining second channel estimates for each subset of transmit antennas for the second portion of the signal. As such, the second channel estimates for each subset of transmit antennas depend on pilot symbols received during the second portion of the signal and on corresponding ones of the first channel estimates for each subset of transmit antennas. With this approach, the corresponding ones of the first channel estimates for the subsets of transmit antennas are used to improve estimation of the second channel estimates for the subsets of transmit antennas.

In another embodiment, a receiver circuit is configured to perform channel estimation for a signal having a first portion transmitted using a transmit delay diversity scheme and a second portion transmitted using another multi-antenna transmission scheme. The receiver circuit includes one or more processing circuits configured to determine first channel estimates for each subset of transmit antennas by first determining a composite channel estimate and then determining the first channel estimates for the subsets of transmit antennas from the composite channel estimate. The processing circuit(s) are further configured to determine second channel estimates for each subset of transmit antennas as a function of pilot symbols received in the second portion of the signal and corresponding ones of the first channel estimates. That is, the receiver circuit uses the corresponding ones of the first channel estimates for each subset of transmit antennas to improve estimation of the second channel estimates for each subset of transmit antennas for the second portion of the signal.

As a non-limiting example, the above method and receiver circuit may be used in a WiMax-based wireless communication network, wherein at least some of the same transmit antennas are used to transmit both the preamble and data portions of downlink frames, but where the preamble portion is transmitted using transmit delay diversity and the data portion is transmitted using another multi-antenna transmission scheme. Generally, in such contexts, the number of antenna-specific pilots is greater in the preamble portion of the downlink frame than in the data portion, thus the preamble portion of the signal constitutes a relatively pilot rich signal in comparison to the data portion of the signal. As such, the relatively good channel estimates for each subset of transmit antennas made for the preamble portion of the signal may be used to improve channel estimation for those transmit antenna subsets for the data portion of the signal.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication device having a receiver circuit for carrying out a method of antenna-specific channel estimation as taught herein, shown in context with a multi-antenna transmitter in a wireless communication network.

FIG. 2 is a diagram of the downlink portion for a typical WiMax signal frame.

FIG. 3 is a diagram of typical pilot subcarrier allocations in the data portion of a WiMax frame, for selected transmit antenna subsets and selected symbol times.

FIG. 4 is a logic flow diagram for one embodiment of a method of antenna-specific channel estimation as taught herein.

FIG. 5 is a block diagram of one embodiment of the receiver circuit for antenna-specific channel estimation, as first illustrated in FIG. 1.

DETAILED DESCRIPTION

FIG. 1 at least partially illustrates a wireless communication network 8, which includes a transmitter 10 having two or more transmit antennas 12. The transmitter 10 transmits signals to a wireless communication device 14, which receives those signals via one or more receive antennas 16. The illustrated embodiment of the wireless communication device 14 includes a receiver 18, a transmitter 20, and additional processing circuits/user interface 22.

Those skilled in the art will appreciate that the particular physical and functional arrangement adopted for the wireless communication device 14 will vary with its intended use. For example, the wireless communication device 14 may comprise a cellular radiotelephone, wireless pager, wireless network card/modem, or other such device providing wireless communication with the network 8. Of more particular interest is the receiver circuit 24, which may be included within the receiver 18, e.g., such as by appropriately configuring a baseband digital signal processor, microprocessor, ASIC, FPGA, or other such processing circuit.

According to one or more embodiments, the receiver circuit 24 performs channel estimation for a signal having a first portion transmitted using a transmit delay diversity scheme and a second portion transmitted using another multi-antenna transmission scheme. With this configuration, the receiver circuit 24 uses the corresponding ones of the first channel estimates for each subset of transmit antennas to improve estimation of the second channel estimates for each subset of transmit antennas for the second portion of the signal.

FIG. 2 illustrates a non-limiting example context wherein the channel estimation method implemented by the receiver circuit 24 may be put to advantageous use. Specifically, FIG. 2 illustrates the downlink portion of a typical WiMax signal frame—i.e., a typical signal frame structure as provided for by the IEEE 802.16 standards. From the illustration, one sees that an initial portion of the frame comprises a preamble, followed by selected other portions, which may be collectively regarded as a data portion. To ensure compatibility with a range of receiver types, it may be desirable to transmit the preamble portion using transmit delay diversity, wherein the same preamble is transmitted from different ones of the transmit antennas 12 at different time offsets. However, to take advantage of the capabilities of individually targeted receivers, it may be desirable to transmit all or parts of the data portion using another multi-antenna transmission scheme.

With that approach, the preamble portion of the signal represents a relatively pilot-rich signal environment, because all of the pilot subcarriers allocated within the preamble are being transmitted from all of the transmit antennas 12 being used for transmit delay diversity transmission of the preamble. In contrast, the data portion of the signal will have less antenna-specific pilot information, if the pilot subcarriers allocated within the data portion are split or otherwise divided across the transmit antennas 12 used for multi-antenna transmission of the data portion of the signal. See, for example, FIG. 3, which, for a given number of OFDM symbols, illustrates a typical split allocation of pilot subcarriers for a two-antenna transmission case. The data portion also has fewer pilots because pilot subcarriers are shared with data subcarriers.

Whether set in the context of WiMax or not, those skilled in the art will appreciate that the receiver circuit 24 can be configured to exploit the relatively pilot-rich environment of a transmit delay diversity transmission to improve the determination of channel estimates for each subset of transmit antennas for another form of multi-antenna transmission juxtaposed with the transmit delay diversity transmission. For example, where another form of multi-antenna transmission closely follows in time a transmit delay diversity transmission. FIG. 4 illustrates a method of such channel estimation, which may be implemented via hardware, software, or any combination thereof, in the receiver circuit 24.

The illustrated method comprises determining a composite channel estimate for the first portion of the signal, e.g., from the pilot symbols received in the first portion (Step 100), and then determining the first channel estimates for each subset of transmit antennas by segregating the composite channel estimate into delay groups corresponding to time offsets of the transmit delay diversity scheme (Step 102), and further includes determining second channel estimates for each subset of transmit antennas as a function of pilot symbols received in the second portion of the signal and corresponding ones of the first channel estimates for each subset of transmit antennas (Step 104). As such, the corresponding ones of the first channel estimates for each subset of transmit antennas are used to improve estimation of the second channel estimates for each subset of transmit antennas for the second portion of the signal. In this sense, "corresponding ones" indicates the use of first and second channel estimates relating to the same subsets of transmit antennas.

In the above context, determining the second channel estimates for each subset of transmit antennas as a function of pilot symbols received in the second portion of the signal and corresponding ones of the first channel estimates for each subset of transmit antennas may comprise using the corresponding ones of the first channel estimates for each subset of transmit antennas, or statistics derived therefrom, as initial values used in the determination of the second channel estimates for each subset of transmit antennas from the pilot symbols received for the second portion of the signal.

For example, that usage may comprise performing tracking-based channel estimation, where the corresponding ones of the first channel estimates for each subset of transmit antennas are used as starting values for the second channel estimates for each subset of transmit antennas. With that approach, the initial values are based on the first channel estimates for each subset of transmit antennas, and are then updated over the second portion of the signal as a function of the pilot symbols received in the second portion of the signal. As another example, usage of the first channel estimates for each subset of transmit antennas for estimation of the second channel estimates for each subset of transmit antennas may comprise performing Minimum Mean Square Error (MMSE) estimation, wherein the corresponding ones of the first channel estimates for each subset of transmit antennas are used to generate one or more channel statistics for MMSE estimation of the second channel estimates for each subset of transmit antennas as a function of the pilot symbols received in the second portion of the signal.

By way of further representative but non-limiting detail, segregating the composite channel determined in the first portion of the received signal into delay groups corresponding to time offsets of the transmit delay diversity scheme may comprise determining the time offsets of the transmit delay diversity scheme from observations of the pilot symbols received in the first portion of the signal. The time offsets so determined may then be used to segregate the composite channel determined from the first portion of the signal into the delay groups, where each delay group corresponds to transmit antennas 12. Here, a "subset" of transmit antennas 12 may comprise one transmit antenna, or an associated group of two or more transmit antennas. In either case, the receiver circuit 24 develops corresponding channel estimates for each subset of transmit antennas.

In one particular embodiment, determining the time offsets of the transmit delay diversity scheme—i.e., the transmit delays between the subsets of antennas being used in the transmit delay diversity scheme-comprises associating portions of the composite channel estimate having proximate delays into given delay groups, determining a center of each delay group, and taking distances between the centers of respective delay groups as the time offsets of the transmit delay diversity scheme. More generally, segregating the composite channel estimate determined from the first portion of the signal into delay groups corresponding to time offsets of the transmit delay diversity scheme may comprise performing a blind estimation of the time offsets of the transmit delay diversity scheme. As a non-limiting example, blind estimation of the time offsets of the transmit delay diversity scheme may comprise accumulating channel tap energies for the first portion of the signal, e.g, from pilot symbols received in the first portion of the signal, hypothesizing delay group centers against a defined delay grid based on the accumulated energies, and determining the time offsets of the transmit delay diversity scheme based on spacing between the delay group centers.

In more detail, the use of transmit delay diversity allows an appropriately configured receiver to partition the "composite" channel estimate among the different transmit antennas in order to obtain channel estimates for each subset of transmit antennas that are suitable for data demodulation. That is, with transmit delay diversity, a conventional receiver perceives the received signal as a signal transmitted from a single transmit antenna, albeit with a different channel than the channel between a single antenna and the receiver. The new channel is a juxtaposition of the channel responses from each subset of transmit antennas subset used in the transmit delay diversity scheme, separated by the delays applied to the signal between transmit antenna subsets.

Assuming the use of two transmit antennas 12 as a non-limiting example (referred to as Antenna 1 and Antenna 2), and a cyclic transmit diversity delay time of D between signal transmissions from Antenna 1 and Antenna 2, the receiver circuit 24 can estimate the channels from Antennas 1 and 2 by first estimating a joint channel for the first portion of the signal (e.g., the preamble), and then partitioning that joint estimate for the two antennas based on the delay D.

Such operations may be performed by estimating the joint (composite) channel over the preamble. If the joint channel is estimated in the frequency domain, it is converted into the time domain for separation according to the delay D. For example, if $h_1(n)$ and $h_2(n)$ are the channel impulse responses for Antennas 1 and 2, respectively, the joint channel response is given by $$h(n)=h_1(n)+h_2(n-D) \qquad \text{Eq. (1)}$$

In another embodiment, the receiver circuit 24 directly estimates the individual channels $h_1(n)$ and $h_2(n)$ from the pilot symbols in the first portion of the received signal without first estimating the composite channel h(n). It can do this using knowledge of the delay D, or estimate D jointly with $h_1(n)$ and $h_2(n)$.

In some applications, it may be convenient to signal the value of the delay D to the wireless communication device 14, such that the receiver circuit 24 is provided with direct knowledge of the delay value used for the transmit delay diversity scheme being employed. Likewise, in some instances, it may be convenient simply to use a preconfigured value for the delay D, such that the receiver circuit 24 can be configured with knowledge of that value. However, in one or more embodiments taught herein, the receiver circuit 24 is configured to determine the delay value D, such as from its observations of the pilot symbol delay groupings obtained for the first portion of the signal. That is, the receiver circuit 24 can be configured to estimate the delay D, and to use that estimate of the delay for portioning the composite channel obtained from pilot symbols received in the first portion of the signal. Commonly, the delay value D will not change over time within a given cell or sector of the network 8, thus the receiver circuit 24 can make a long term estimate for any particular cell or sector.

In one or more other embodiments, the receiver circuit 24 is configured to estimate the partitioned channel—i.e., to obtain channel estimates for each subset of transmit antennas from the pilot symbols received during the transmit delay diversity transmission-based on the frequency responses of the channels.

In a different embodiment, it is also possible to estimate the partitioned channel from the frequency responses of the channels. The frequency responses of $h_1(n)$ and $h_2(n)$ may be respectively denoted as $H_1(k)$ and $H_2(k)$, which are given by $$H_1(k) = \sum_{n=0}^{N-1} h_1(n) e^{-j2\pi kn/N} \quad \text{Eq. (2)}$$

and $$H_2(k) = \sum_{n=0}^{N-1} h_2(n) e^{-j2\pi kn/N} \quad \text{Eq. (3)}$$

For a given delay D, the combined channel frequency response at a frequency k is given by $$H_1(k) + e^{-jkD} H_2(k) \quad \text{Eq. (4)}$$

Using this knowledge, the receiver circuit 24 can be configured to estimate the individual channels $H_1(k)$ and $H_2(k)$. In general, the channels $H_1(k)$ and $H_2(k)$ remain constant (or vary very slowly) over some range of frequency. The receiver circuit 24 therefore can make use of this knowledge to estimate $H_1(k)$, $H_2(k)$, and D.

For example, for different postulates of the delay D, the receiver circuit 24 can be configured to estimate $H_1(k)$ and $H_2(k)$ over a range of frequencies k where the channel estimates may be assumed to be constant. Such estimation, for example, can be done using a least-squares technique. For each such postulate of the delay D, the mean square error can be calculated by the receiver circuit 24, and the value of D that minimizes the mean square error can be selected as the most likely or best estimate of the delay D, along with the corresponding values of $H_1(k)$ and $H_2(k)$. The receiver circuit 24 can be configured to repeat this procedure for different ranges of the frequency k.

In another embodiment, the receiver circuit 24 may estimate $H_1(k)$, $H_2(k)$, and D directly from the pilots in the received signal without going through the step of first estimating H(k).

From the above examples, it should be apparent that the receiver circuit 24 can be configured to determine channel estimates for each subset of transmit antennas from the pilot symbols received during a transmit delay diversity transmission, based on identifying the time offsets (delay D) that time-wise separate the clusters of pilot symbols received as part of that transmit delay diversity transmission. Once these first channel estimates for each subset of transmit antennas have been determined, the receiver circuit 24 is configured to use them to improve channel estimation in juxtaposed regions of the received signal that were transmitted using another multi-antenna transmission scheme.

FIG. 5 illustrates functional circuit details for one embodiment of the receiver circuit 24, which may be configured to implement the method of channel estimates as taught herein, or variations of that method. The depicted one or more processing circuits comprising the receiver circuit 24, which may be implemented in hardware, software, or any combination thereof, include a first channel estimator 40 configured to determine the first channel estimates for each subset of transmit antennas, and a second channel estimator 42 configured to determine the second channel estimates for each subset of transmit antennas. The first channel estimator 40 includes a time offset estimator 44 configured to estimate the time offsets of the transmit delay diversity scheme used to transmit the first portion of the signal—e.g., the time offset estimator 44 is configured to estimate the delay D, which is used as the basis for partitioning the composite channel obtained from the transmit delay diversity transmission portion of the signal into segregated groups of channel taps corresponding to the different transmit antenna subsets involved in the transmit delay diversity transmission.

Also, as illustrated, the receiver circuit 24 may be associated with a demodulator/decoder 50, which uses the first and/or second channel estimates for each subset of transmit antennas to recover data from the first and/or second portions of the received signal. Also, it should be noted that as used herein referring to a signal having "first" and "second" portions is intended at a minimum to encompass circumstances where a first signal is transmitted using transmit delay diversity and a second, juxtaposed signal is transmitted using a different form of multi-antenna transmission. While it may normally be the case that the first and second signal portions are related, such as the preamble and data portions of WiMax downlink frames, it is not necessarily the case.

Of course, this method contemplates variations in how the first channel estimates for each subset of transmit antennas are used to improve the second channel estimates for each subset of transmit antennas. For example, as noted earlier herein, the first channel estimates for each subset of transmit antennas may be used as initial values in a tracking-based approach, wherein these initial values generated from the first portion of the signal are then updated for the second portion of the signal, based on pilot symbols received during the second portion of the signal. Alternatively, the first channel estimates for each subset of transmit antennas may be used to determine statistics—e.g., channel mean values—for MMSE estimation of the second channel estimates for each subset of transmit antennas.

As a further refinement of the method, one or more embodiments of channel estimation as taught herein contemplate weighting the first channel estimates for each subset of transmit antennas, or otherwise varying the extent to which their values influence the determination of the second channel estimates for each subset of transmit antennas. For example, the first channel estimates for each subset of transmit antennas become increasingly "stale" with increasing transmission time separation between the first and second portions of the signal. In other words, particularly in rapidly changing channel conditions (fast fading conditions), the antenna-specific channel conditions may have changed significantly from signal time at which a given first antenna-specific channel estimate was determined and the signal time for which a given second antenna-specific channel estimate is determined. Conversely, where channel conditions are slowly varying in time, or it is estimated or otherwise determined that the second channel estimates for each subset of transmit antennas are noisy or otherwise unreliable, it may be preferable to weight the influence of the first antenna-specific channel estimate more heavily.

Thus, in at least one embodiment taught herein, channel estimation includes dynamically changing an extent to which the first channel estimates for each subset of transmit antennas influence the determination of the second channel estimates for each subset of transmit antennas as a function of channel fading conditions. The same or one or more other embodiments of the method include dynamically changing an extent to which the first channel estimates for each subset of transmit antennas influence the determination of the second channel estimates for each subset of transmit antennas as a function of the signal time differences between determination of the first channel estimates for each subset of transmit antennas and the second channel estimates for each subset of transmit antennas.

Fortunately, one generally can expect relatively consistent channel conditions between the preamble portion of a WiMax downlink frame, and the data portion of that same frame. Thus, while not a limiting example of channel estimation as taught herein, it should be understood that potentially significant improvements to channel estimation for the data portion of a WiMax downlink frame may be gained by basing such estimation not only on the pilot symbols received on OFDM subcarriers within that data portion, but also on the channel estimates determined from pilot subcarriers within the preamble portion of that same frame. More generally, where a signal of interest, e.g., an OFDM signal, includes a preamble portion and a subsequent data portion, channel estimates determined from the preamble portion of the signal are used to improve channel estimation during the data or payload portion of the signal.

Of course, one aspect of obtaining these improved channel estimates is their use in recovering data from the second (data) portion of the signal. That is, the improved channel estimates generated for the data portion of the signal provide for more accurate data recovery, which correspondingly lowers data error rates, such as Block Error Rates (BERs), Packet Error Rates (PERs), or the like.

With that and other contemplated uses of the improved second channel estimates for each subset of transmit antennas in mind, those skilled in the art will appreciate that the present invention is not limited by the foregoing discussion, nor is it limited by the accompanying illustrations. Indeed, the present invention is limited only by the following claims and their legal equivalents.

What is claimed is:

1. A method of channel estimation for a signal having a first portion transmitted using a transmit delay diversity scheme and a second portion transmitted using another multi-antenna transmission scheme, the method comprising:

determining a composite channel estimate for the first portion of the signal;

determining first channel estimates for each subset of transmit antennas based on segregating the composite channel estimate into delay groups corresponding to time offsets of the transmit delay diversity scheme; and determining second channel estimates for each subset of transmit antennas as a function of corresponding ones of the first channel estimates for each subset of transmit antennas and as a function of pilot symbols received in the second portion of the signal, such that the corresponding ones of the first channel estimates for each subset of transmit antennas are used to improve estimation of the second channel estimates for each subset of transmit antennas for the second portion of the signal.

2. The method of claim 1, wherein determining second channel estimates for each subset of transmit antennas as a function of corresponding ones of the first channel estimates for each subset of transmit antennas and as a function of pilot symbols received in the second portion of the signal comprises using the corresponding ones of the first channel estimates for each subset of transmit antennas, or statistics derived therefrom, as initial values used in the determination of the second channel estimates for each subset of transmit antennas from the pilot symbols received for the second portion of the signal.

3. The method of claim 2, wherein using the corresponding ones of the first channel estimates for each subset of transmit antennas, or statistics derived therefrom, as initial values used in the determination of the second channel estimates for each subset of transmit antennas comprises performing tracking-based channel estimation wherein the corresponding ones of the first channel estimates for each subset of transmit antennas are used as starting values for the second channel estimates for each subset of transmit antennas, which are then updated over the second portion of the signal as a function of the pilot symbols received in the second portion of the signal.

4. The method of claim 2, wherein using the corresponding ones of the first channel estimates for each subset of transmit antennas, or statistics derived therefrom, as initial values used in the determination of the second channel estimates for each subset of transmit antennas comprises performing Minimum Mean Square Error (MMSE) estimation wherein the corresponding ones of the first channel estimates for each subset of transmit antennas are used to generate one or more channel statistics for MMSE estimation of the second channel estimates for each subset of transmit antennas as a function of the pilot symbols received in the second portion of the signal.

5. The method of claim 1, wherein segregating the composite channel estimate determined from the first portion of the signal into delay groups corresponding to time offsets of the transmit delay diversity scheme comprises determining the time offsets of the transmit delay diversity scheme based on accumulating channel tap energies for the first portion of the signal and using that determination of the time offsets to segregate the composite channel estimate into the delay groups.

6. The method of claim 5, wherein determining the time offsets of the transmit delay diversity scheme based on accumulating channel tap energies for the first portion of the signal comprises associating channel taps having proximate delays into given delay groups, determining a center of each delay group, and taking distances between the centers of respective delay groups as the time offsets of the transmit delay diversity scheme.

7. The method of claim 1, wherein segregating the composite channel estimate into delay groups corresponding to time offsets of the transmit delay diversity scheme comprises performing a blind estimation of the time offsets of the transmit delay diversity scheme.

8. The method of claim 7, wherein performing a blind estimation of the time offsets of the transmit delay diversity scheme comprises accumulating channel tap energies for the first portion of the signal, hypothesizing delay group centers against a defined delay grid based on the accumulated channel tap energies, and determining the time offsets of the transmit delay diversity scheme based on spacing between the delay group centers.

9. The method of claim 1, wherein the signal comprises an OFDM signal, and wherein the first portion of the signal is a preamble portion and wherein the second portion of the signal is a data or payload portion, such that the method of claim 1 comprises using channel estimates determined from the preamble portion of the signal to improve channel estimation during the data or payload portion of the signal.

10. The method of claim 9, wherein the OFDM signal comprises an IEEE 802.16 signal, and wherein the first portion of the signal comprises a preamble portion of a signal frame and the second portion of the signal comprises a data portion of the signal frame.

11. The method of claim 1, further comprising recovering data from the second portion of the signal based at least in part on the second channel estimates for each subset of transmit antennas.

12. The method of claim 1, further comprising dynamically changing an extent to which the first channel estimates for each subset of transmit antennas influence the determination of the second channel estimates for each subset of transmit antennas as a function of channel fading conditions.

13. The method of claim 1, further comprising dynamically changing an extent to which the first channel estimates for each subset of transmit antennas influence the determination of the second channel estimates for each subset of transmit antennas as a function of the time between determination of the first channel estimates for each subset of transmit antennas and determination of the second channel estimates for each subset of transmit antennas.

14. A receiver circuit to perform channel estimation for a signal having a first portion transmitted using a transmit delay diversity scheme and a second portion transmitted using another multi-antenna transmission scheme, the receiver circuit comprising one or more processing circuits configured to:
determine a composite channel estimate for the first portion of the signal; and
determine first channel estimates for each subset of transmit antennas based on segregating the composite channel estimate into delay groups corresponding to time offsets of the transmit delay diversity scheme; and
determine second channel estimates for each subset of transmit antennas as a function of corresponding ones of the first channel estimates for each subset of transmit antennas and as a function of pilot symbols received in the second portion of the signal, such that the corresponding ones of the first channel estimates for each subset of transmit antennas are used to improve estimation of the second channel estimates for each subset of transmit antennas for the second portion of the signal.

15. The receiver circuit of claim 14, wherein the receiver circuit is configured to determine the second channel estimates for each subset of transmit antennas as a function of corresponding ones of the first channel estimates for each subset of transmit antennas and as a function of pilot symbols received in the second portion of the signal by using the corresponding ones of the first channel estimates for each subset of transmit antennas, or statistics derived therefrom, as initial values used in the determination of the second channel estimates for each subset of transmit antennas from the pilot symbols received for the second portion of the signal.

16. The receiver circuit of claim 15, wherein the receiver circuit is configured to use the corresponding ones of the first channel estimates for each subset of transmit antennas, or the statistics derived therefrom, as the initial values used in the determination of the second channel estimates for each subset of transmit antennas by performing tracking-based channel estimation wherein the corresponding ones of the first channel estimates for each subset of transmit antennas are used as starting values for the second channel estimates for each subset of transmit antennas, which are then updated over the second portion of the signal as a function of the pilot symbols received in the second portion of the signal.

17. The receiver circuit of claim 15, wherein the receiver circuit is configured to use the corresponding ones of the first channel estimates for each subset of transmit antennas, or the statistics derived therefrom, as the initial values used in the determination of the second channel estimates for each subset of transmit antennas by performing Minimum Mean Square Error (MMSE) estimation wherein the corresponding ones of the first channel estimates for each subset of transmit antennas are used to generate one or more channel statistics for MMSE estimation of the second channel estimates for each subset of transmit antennas as a function of the pilot symbols received in the second portion of the signal.

18. The receiver circuit of claim 14, wherein the receiver circuit is configured to segregate the composite channel estimate determined from the first portion of the signal into the delay groups corresponding to the time offsets of the transmit delay diversity scheme by determining the time offsets of the transmit delay diversity scheme based on accumulating channel tap energies for the first portion of the signal and using that determination of the time offsets to segregate the composite channel into the delay groups.

19. The receiver circuit of claim 18, wherein the receiver circuit is configured to determine the time offsets of the transmit delay diversity scheme based on accumulating channel tap energies for the first portion of the signal by associating channel taps having proximate delays into given delay groups, determining a center of each delay group, and taking distances between the centers of respective delay groups as the time offsets of the transmit delay diversity scheme.

20. The receiver circuit of claim 14, wherein the receiver circuit is configured to segregate the composite channel estimate into delay groups corresponding to the time offsets of the transmit delay diversity scheme by performing a blind estimation of the time offsets of the transmit delay diversity scheme.

21. The receiver circuit of claim 20, wherein the receiver circuit is configured to perform the blind estimation of the time offsets of the transmit delay diversity scheme by accumulating channel tap energies for the first portion of the signal, hypothesizing delay group centers against a defined delay grid based on the accumulated channel tap energies, and determining the time offsets of the transmit delay diversity scheme based on spacing between the delay group centers.

22. The receiver circuit of claim 14, wherein the signal comprises an OFDM signal, and wherein the first portion of the signal is a preamble portion and wherein the second portion of the signal is a data or payload portion, and wherein the receiver circuit is configured to use the channel estimates determined from the preamble portion of the signal to improve channel estimation during the data or payload portion of the signal.

23. The receiver circuit of claim 22, wherein the OFDM signal comprises an IEEE 802.16 signal, and wherein the first portion of the signal comprises a preamble portion of a signal frame and the second portion of the signal comprises a data portion of the signal frame.

24. A wireless communication device having a wireless communication receiver including the receiver circuit of claim 14.

25. The receiver circuit of claim 14, wherein the one or more processing circuits comprise a first channel estimator configured to determine the first channel estimates for each subset of transmit antennas, and a second channel estimator configured to determine the second channel estimates for each subset of transmit antennas.

26. The receiver circuit of claim 25, wherein the first channel estimator includes a time offset estimator configured to estimate the time offsets of the transmit delay diversity scheme used to transmit the first portion of the signal.

27. The receiver circuit of claim 14, wherein the receiver circuit is configured to dynamically change an extent to which the first channel estimates for each subset of transmit antennas influence the determination of the second channel estimates for each subset of transmit antennas as a function of channel fading conditions.

28. The receiver circuit of claim 14, wherein the receiver circuit is configured to dynamically change an extent to which the first channel estimates for each subset of transmit antennas influence the determination of the second channel estimates for each subset of transmit antennas, as a function of the time between determination of the first channel estimates for each subset of transmit antennas and determination of the second channel estimates for each subset of transmit antennas.

29. A method of channel estimation for a received signal having a first portion transmitted using a form of transmit delay diversity and a second portion transmitted using another form of multi-antenna transmission, the method comprising:
   determining a composite channel estimate for the first portion of the signal;
   determining first channel estimates for each subset of transmit antennas from the composite channel estimate; and
   using the first channel estimates for each subset of transmit antennas in a channel estimation process used for determining second channel estimates for each subset of transmit antennas for the second portion of the signal, such that the second channel estimates for each subset of transmit antennas depend on corresponding ones of the first channel estimates for each subset of transmit antennas and on pilot symbols received during the second portion of the signal.

30. The method of claim 29, wherein the first portion of the received signal comprises a preamble portion and the second portion of the received signal comprises a data portion.

31. The method of claim 29, wherein the another form of multi-antenna transmission comprises one of a space-time coded transmission and a multi-stream transmission.

* * * * *